Nov. 28, 1944.  M. A. LICHTEN  2,363,602
LIQUID MEASURER
Filed Jan. 4, 1943   2 Sheets-Sheet 1
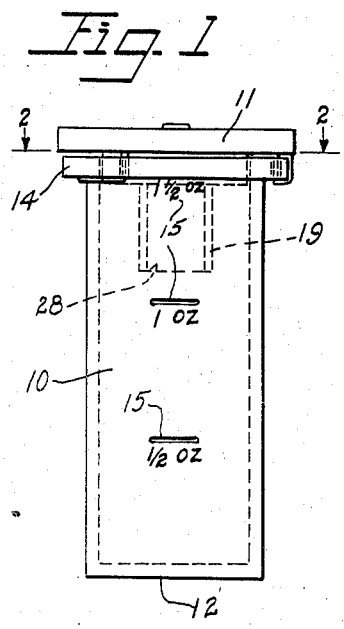
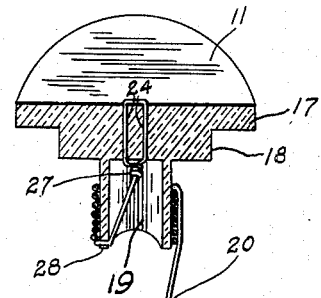
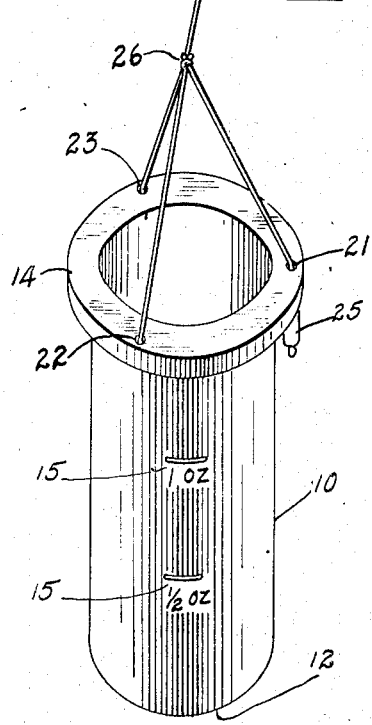
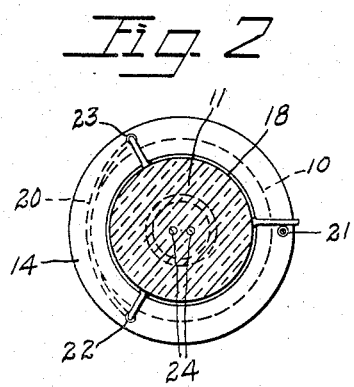
INVENTOR
M. A. LICHTEN
By
ATTORNEY

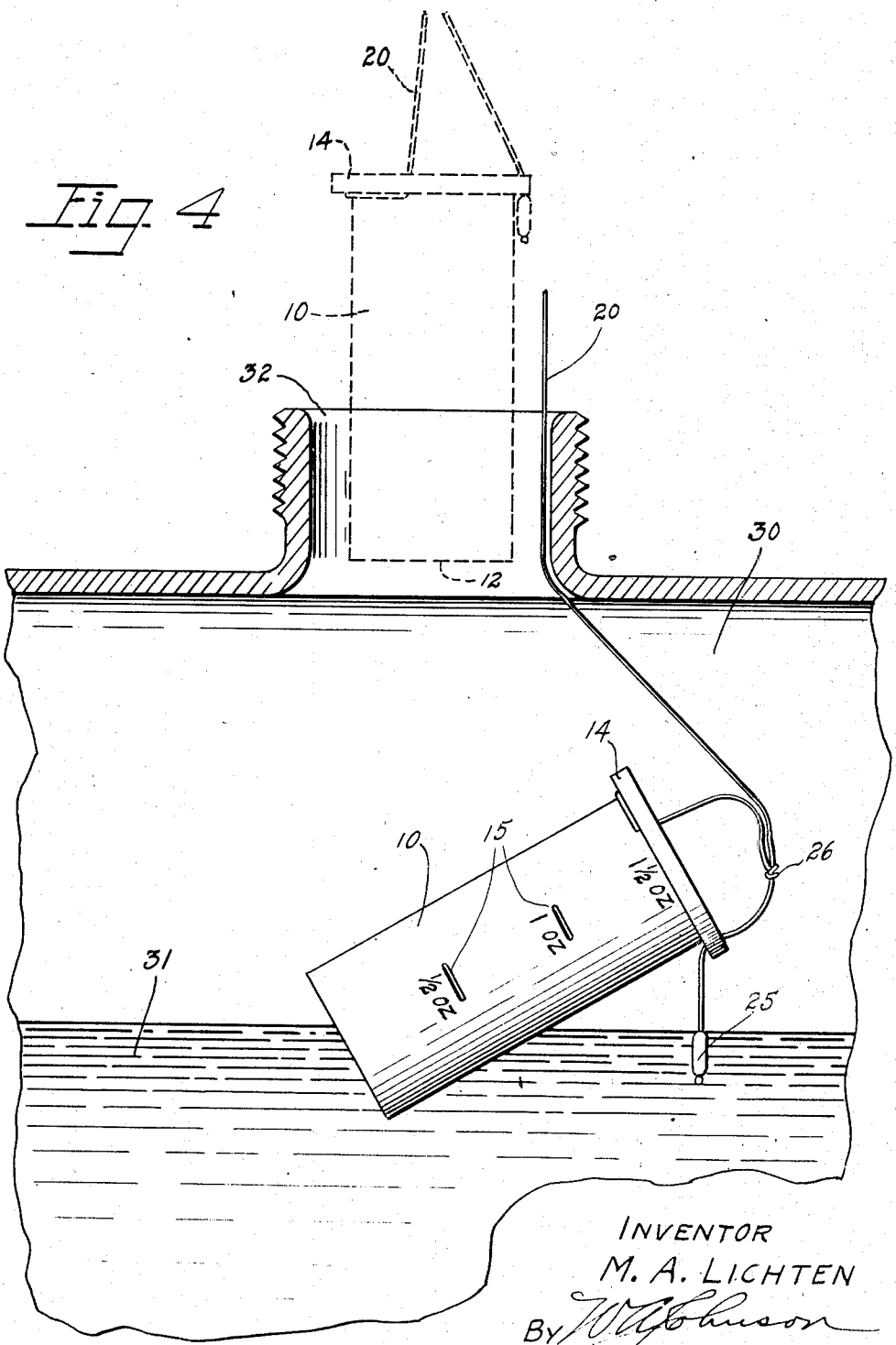

Patented Nov. 28, 1944

2,363,602

UNITED STATES PATENT OFFICE 2,363,602

LIQUID MEASURER

Maurice A. Lichten, West Orange, N. J.

Application January 4, 1943, Serial No. 471,257

2 Claims. (Cl. 222—356)

This invention relates to liquid measurers and more particularly to devices for rationing water from water casks in life boats.

The rationing of water to occupants of a life boat, cast adrift at sea without rescue apparent, is of vital importance in maintaining life. Usually such rationing is under the supervision of an officer in charge, yet, unless means is provided whereby the officer can limit each person to his share at given intervals, the supply may be wasted and some may take more than their allotted share, depriving others of their share.

An object of the invention is to provide a liquid measure which is simple in structure, and highly efficient for use in removing measured quantities of a liquid from a receptacle.

With this and other objects in view the invention comprises a liquid measure comprising a hollow container adapted to hold varied quantities of a liquid, means to support the container for movement of the latter into and out of a supply of liquid, and additional means to automatically cause the container to tilt upon striking the liquid and become filled therewith.

Other objects and advantages will be apparent from the following detailed description when considered in conjunction with the accompanying drawings, wherein Fig. 1 is a front elevational view of the liquid measure;

Fig. 2 is a horizontal sectional view of the liquid measure taken along the line 2—2 of Fig. 1;

Fig. 3 is a perspective view of the liquid measure with the cover shown in section and separated from the container, and Fig. 4 is a fragmentary sectional view of a water cask illustrating in dotted and full lines different positions of the liquid measure during the process of obtaining a measured quantity of liquid from the cask.

Referring now to the drawings, attention is first directed to Figs. 1, 2 and 3 where the details of the liquid measurer are shown. The liquid measurer includes two main parts, namely a container 10 and a cover 11 therefor. These parts may be formed of any suitable material, preferably a non-breakable transparent material, such as certain plastics, one being commercially known as "Lucite."

The container 10 is cylindrical in general contour with a closed bottom 12 and an annular flange 14 integral with the open end thereof. Graduations 15 indicating varied quantities of liquid, such as water, when disposed in the container, are formed in the outer wall of the container, together with the capacities of the container at these levels or graduations.

The cover 11 is circular in general contour with an outer portion 17 larger in diameter than the flange 14 so that the user may firmly grip the said outer portion when desirous of removing the cover from the container. A reduced portion 18 is smaller in diameter than the inner diameter of the container so as to be received in the open end of the container. An integral tubular portion 19 serves as an arbor upon which a strand 20, connecting the cover 11 to the container 10, may be wound.

Before describing the method of connecting the strand 20 to the container and the cover attention is directed to the apertures 21, 22 and 23 in the flange 14 and the pair of apertures 24 in the cover 11. The apertures 21, 22 and 23 are equally spaced about the flange outside the general periphery of the container. The pair of apertures 24 are parallel with each other and enter the tubular portion 19.

The strand 20 may be formed of any suitable material, that in the present embodiment being commercially known as "nylon." Furthermore, the complete strand structure is of one piece of material. Starting with one end, upon which a weight 25 is secured, the strand is fed upwardly through the aperture 21 to a point adjacent a knot 26 and then downwardly through the aperture 22. The knot 26 is not formed at this time but has been identified to indicate the center of the loop formed in the strand between the apertures 21 and 22. After the strand passes through the aperture 22 it is fed beneath the flange 14 and adjacent the outer wall of the container between the apertures 22 and 23 where it is fed upwardly through the latter. The strand from the aperture 23 is connected to the center of the aforementioned loop by the forming of the knot 26. A desired length of the strand remains after the knot 26 is tied and the free end thereof is passed upwardly through one aperture 24 and downwardly through the other where another knot 27 completes the assembly.

When not in use the cover 11 closes the container 10 as shown in Fig. 1. When in this position the main length of strand 20 is wound on the arbor or tubular portion 19. To assist in the winding of the strand on the arbor a notch 28 is formed in the lower edge of the arbor to hold the strand adjacent the first turn. When the cover is in the closed position the supporting legs of the strand extend between the portion 18 of the cover and the inner wall of the container providing equally spaced wedges or locking portions serving to hold the cover closed. However, through the application of sufficient force the cover may be readily removed.

To illustrate the use of the liquid measurer a fragmentary portion of a water cask 30, which in the present embodiment is a part of a life boat equipment, is shown partially filled with water 31 and having a mouth or opening 32. The opening 32 is too small to receive any part of the life boat equipment, other than the container 10, for removing the water from the cask. Thus, with the cask in a fixed position, quantities of the water may be obtained only through the aid of the liquid measurer.

When such quantities are to be removed, the person in charge removes the cover 11 from the container 10, letting container drop while retaining hold of the cover. The container may thus be lowered through the opening 32 and into the cask 30. The container is light in weight and the moment its bottom portion 12 strikes the surface of the water and the supporting strand is made loose, the weight 25 on the free leg of the strand will tip the container and pull the open end thereof into the water. It will be observed that the free leg of the strand is not fixed in its aperture 21 but is free to move therein. However, there exists a given friction, between the free leg and the wall or edges of the aperture, which is sufficient to place the downward pulling force of the weight at the portion of the container adjacent the aperture 21 and cause not only tilting of the container but pulling of the container into the water provided the water is of sufficient depth. The container will thus be filled with water and may, through an upward pull on the strand, be removed from the cask. If, as in the present illustration, the quantity to be rationed is 1½ ounces, then this process of filling the container will be repeated for each person. Through the aid of the graduations 15 and the transparency of the container smaller quantities of water may be rationed, the excess quantities being returned to the cask by the person in charge.

When the liquid measurer is in use, no effort is required in obtaining the measured quantities of liquid other than the lowering of the container into the cask and the removal of the filled container therefrom. The tilting of the container always in the same manner, about fulcrum points at the apertures 22 and 23, is assured by the ever present force embodied in the weight 25. The strand serves also as a connecting means between the container, which may pass into many hands during a rationing period, and an anchor, namely the cover, which remains in the officer's hand during such times. When not in use the main length of strand may be wound on the arbor 19, and the cover disposed in the open end of the container as shown in Fig. 1. The free leg with the weight 25 may also be disposed in the container before the closing of the container with the cover. The legs of the strand thus serve to hold the cover closed.

Although the liquid measurer has been illustrated as of a given size and for use in rationing water, it will be understood that various modifications may be made therein without departing from the scope and spirit of this invention as defined by the appended claims.

What is claimed is:

1. A liquid measurer of the type described comprising a container having an open end and adapted to receive a given quantity of liquid from a supply thereof, a cover adapted to close the open end of the container, a strand carried by the cover for supporting the container and for use in lowering the container to the supply, and a tubular portion integral with the cover adapted for the winding of the strand thereon and the positioning of the wound strand in the container when the cover closes the open end of the container.

2. A liquid measurer of the type described comprising a container having an open end and adapted to receive a given quantity of liquid from a supply thereof, a cover adapted to close the open end of the container, a strand carried by the cover for supporting the container and for use in lowering the container to the supply, and an arbor carried by the cover adapted for the winding of the strand thereon, and having a notch adapted to hold a given portion of the strand intermediate its ends against displacement during winding of the strand on the arbor.

MAURICE A. LICHTEN.